(12) United States Patent
Punathil

(10) Patent No.: US 11,662,987 B2
(45) Date of Patent: May 30, 2023

(54) LOGICALLY SPLITTING OBJECT CODE INTO MODULES WITH LAZY LOADING OF CONTENT

(71) Applicant: International Business Machines Corporation, Armonk, NY (US)

(72) Inventor: Gireesh Punathil, Kannur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/395,970

(22) Filed: Aug. 6, 2021

(65) Prior Publication Data

US 2023/0044055 A1 Feb. 9, 2023

(51) Int. Cl.
*G06F 8/41* (2018.01)
*G06F 8/35* (2018.01)

(52) U.S. Cl.
CPC . *G06F 8/43* (2013.01); *G06F 8/35* (2013.01)

(58) Field of Classification Search
CPC ..................................... G06F 8/35; G06F 8/43
See application file for complete search history.

(56) References Cited

U.S. PATENT DOCUMENTS

| | | | |
|---|---|---|---|
| 5,291,601 A | 3/1994 | Sands | |
| 5,375,241 A | 12/1994 | Walsh | |
| 5,708,811 A * | 1/1998 | Arendt | G06F 9/44521 719/331 |
| 5,835,749 A | 11/1998 | Cobb | |
| 6,003,095 A | 12/1999 | Pekowski | |
| 6,260,190 B1 * | 7/2001 | Ju | G06F 8/445 712/205 |
| 6,292,843 B1 | 9/2001 | Romano | |
| 8,032,879 B2 | 10/2011 | Nathan | |
| 8,434,099 B2 | 4/2013 | Forin | |
| 9,639,377 B2 | 5/2017 | Goodes | |
| 10,310,872 B2 | 6/2019 | Tsirkin | |
| 2003/0225921 A1 | 12/2003 | Hostetter | |
| 2016/0224327 A1 | 8/2016 | Angelotti | |
| 2022/0229673 A1 * | 7/2022 | Abadzhimarinov | G06F 3/0482 |

OTHER PUBLICATIONS

Chris Richardson, "Overview of POJO programming" (Year: 2006).*
Marc Hull, "Balancing Simplicity and Efficiency in Web Applications" (Year: 2006).*
Carsaro et al., "Virtual Component A Design Pattern for Memory-Constrained Embedded Applications" (Year: 2002).*
Corsaro, et al., "Virtual Component a Design Pattern for Memory-Constrained Embedded Applications", Aug. 2002, 14 pgs., Electrical and Computer Engineering Department, University of California, Irvine, CA, USA, <https://www.researchgate.net/publication/2568005>.
Nnamdi, C., "Boost Angular's Performance by Lazy Loading your Modules", Bits and Pieces, Dec. 17, 2018, 15 pgs., < https://blog.bitsrc.io/boost-angulars-performance-by-lazy-loading-your-modules-ca7abd1e2304>.

* cited by examiner

*Primary Examiner* — Phillip H Nguyen
(74) *Attorney, Agent, or Firm* — David B. Woycechowsky

(57) ABSTRACT

A method for receiving a first portion of object code, analyzing a first portion of object code in a static manner to determine a call tree hierarchy, dividing, by a synthetic compiler, the first portion of object code into a plurality of modules; and starting to run the first portion of object code to start a runtime phase, with the running of the first portion of the object code including: (i) lazy loading of the modules of the plurality of modules of the first portion of object code, and/or (ii) eager unloading of the modules of the plurality of modules of the first portion of object code.

12 Claims, 2 Drawing Sheets

LOGICALLY SPLITTING OBJECT CODE INTO MODULES WITH LAZY LOADING OF CONTENT

BACKGROUND

The present invention relates to the field of object code and also to lazy loading (for example, lazy loading from a disk) and further to eager unloading.

The Wikipedia entry for "object code" (as of Jun. 29, 2021) states, in part, as follows: "In computing, object code or object module is the product of a compiler. In a general sense object code is a sequence of statements or instructions in a computer language, usually a machine code language (i.e., binary) or an intermediate language such as register transfer language (RTL). The term indicates that the code is the goal or result of the compiling process, with some early sources referring to source code as a 'subject program'. Details[.] Object files can in turn be linked to form an executable file or library file. In order to be used, object code must either be placed in an executable file, a library file, or an object file. Object code is a portion of machine code that has not yet been linked into a complete program. It is the machine code for one particular library or module that will make up the completed product. It may also contain placeholders or offsets, not found in the machine code of a completed program, that the linker will use to connect everything together. Whereas machine code is binary code that can be executed directly by the CPU, object code has the jumps partially parametrized so that a linker can fill them in. An assembler is used to convert assembly code into machine code (object code). A linker links several object (and library) files to generate an executable. Assemblers can also assemble directly to machine code executable files without the object intermediary step. (footnote(s) omitted).

The Wikipedia entry for "lazy loading" (as of Jun. 29, 2021) states, in part, as follows: "Lazy loading (also known as asynchronous loading) is a design pattern commonly used in computer programming and mostly in web design and development to defer initialization of an object until the point at which it is needed. It can contribute to efficiency in the program's operation if properly and appropriately used. This makes it ideal in use cases where network content is accessed and initialization times are to be kept at a minimum, such as in the case of web pages. For example, deferring loading of images on a web page until they are needed can make the initial display of the web page faster. The opposite of lazy loading is eager loading."

For purposes of this document, eager unloading is a process of offloading used modules as soon as their respective imminent needs are met. This is in contrast to normal module unloading, wherein the modules are kept for an extended period of time, in anticipation of future use by programs.

Now the concept of offloading will be discussed in a bit more detail. To start with, it should be understood that offloading typically happens from the process memory to a non-volatile storage device (for example, a disk type data storage device). Typically, the process memory: (i) is located in the main RAM (random access memory); (ii) is a logically delineated portion of the RAM. The process memory is where a running process stores its code and data. Offloading is typically an operation that is performed within the confines of a single computer. However, in a virtualized environment where the file system is mounted from a second computer (such as network file system, NFS) then multiple computers may become involved in the offloading operation.

In some computer systems, offloading involves emulated memory and/or an emulated non-volatile data storage device. This can be helpful when running containerized workloads. The inventive features to be set forth in subsequent sections of this document are generally applicable across the spectrum of computer configurations that currently perform the operation of offloading (and especially the eager unloading variety of offloading).

SUMMARY

According to an aspect of the present invention, there is a method, computer program product and/or system that performs the following operations (not necessarily in the following order): (i) receiving a first portion of object code; (ii) analyzing a first portion of object code in a static manner to determine a call tree hierarchy; (iii) dividing, by a synthetic compiler, the first portion of object code into a plurality of modules; and (iv) starting to run the first portion of object code to start a runtime phase, with the running of the first portion of the object code including: (a) lazy loading of the modules of the plurality of modules of the first portion of object code, and/or (b) eager unloading of the modules of the plurality of modules of the first portion of object code.

According to an aspect of the present invention, there is a method, computer program product and/or system that performs the following operations (not necessarily in the following order): (i) receiving a first portion of object code; (ii) analyzing a first portion of object code in a static manner to determine a call tree hierarchy; (iii) dividing, by a synthetic compiler, the first portion of object code into a plurality of modules; and (iv) starting to run the first portion of object code to start a runtime phase, with the running of the first portion of the object code including: (v) lazy loading of the modules of the plurality of modules of the first portion of object code.

According to an aspect of the present invention, there is a method, computer program product and/or system that performs the following operations (not necessarily in the following order): (i) receiving a first portion of object code; (ii) analyzing a first portion of object code in a static manner to determine a call tree hierarchy; (iii) dividing, by a synthetic compiler, the first portion of object code into a plurality of modules; and (iv) starting to run the first portion of object code to start a runtime phase, with the running of the first portion of the object code including: eager unloading of the modules of the plurality of modules of the first portion of object code.

DETAILED DESCRIPTION

Figure 1:
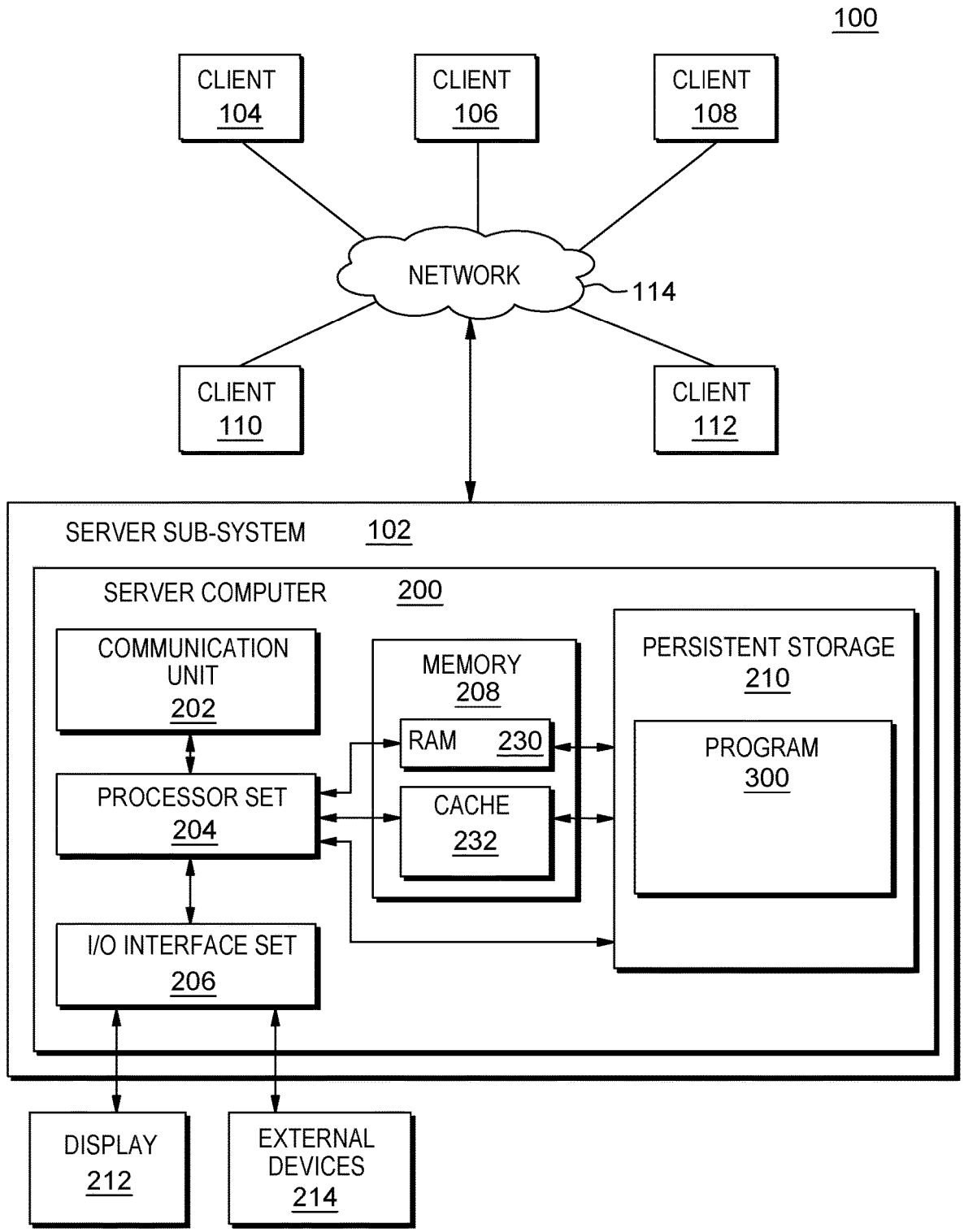
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
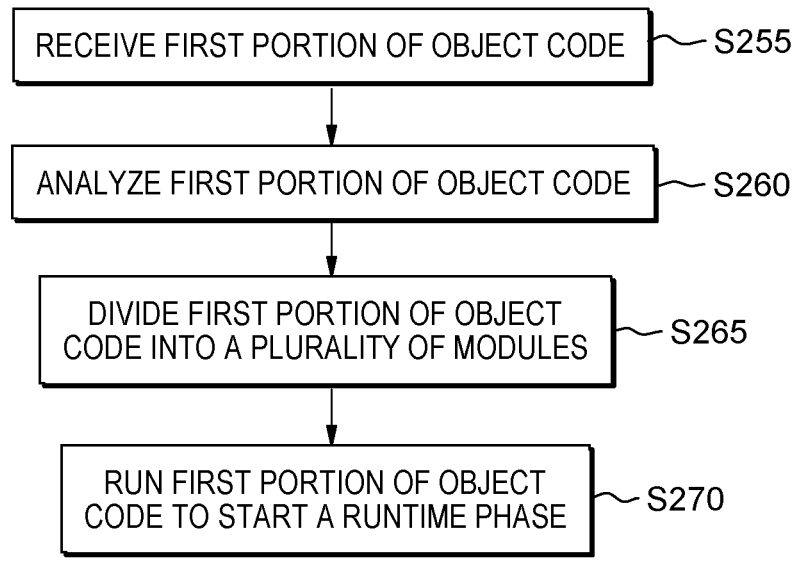
FIG. 2 is a flowchart showing a first embodiment method performed, at least in part, by the first embodiment system.
Figure 3:
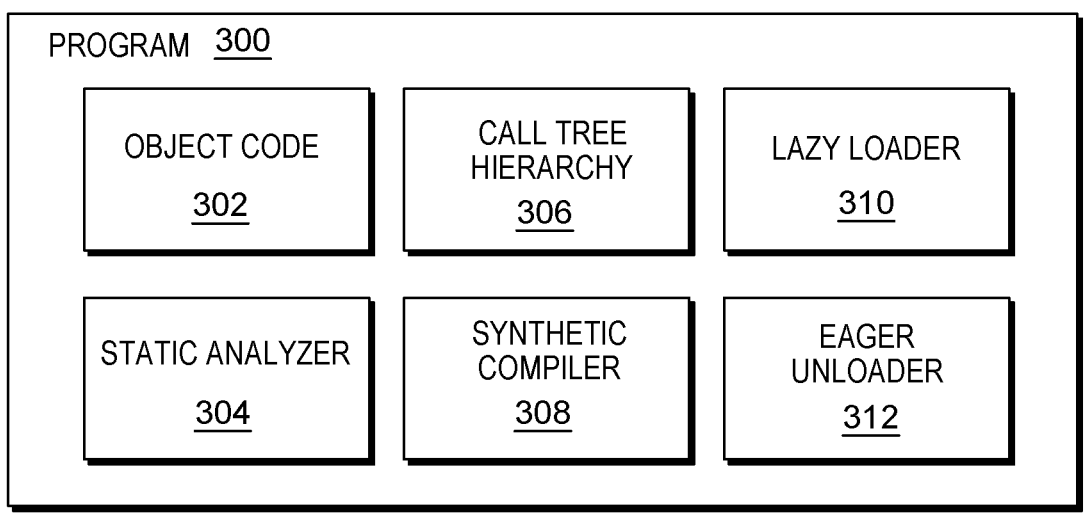
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation 5255, where program 300 receives a first portion of object code 302. In this example, the code is received from client subsystem 104 through network 114.

Processing proceeds to operation 5260, where static analyzer 304 analyzes the first portion of object code in a static manner to determine call tree hierarchy 306.

Processing proceeds to operation 5265, where a synthetic compiler 308 divides the first portion of object code into a plurality of modules (not separately shown in the Figures). The manner in which the number of modules and the respective content may be explained in the following subsection of this Detailed Description section.

Processing proceeds to operation 5270, where the first portion of object code starts to run on processor(s) set 204. This starts a runtime phase, with the running of the first portion of the object code including: (i) lazy loading, by lazy loader 310, various modules of the plurality of modules of the first portion of object code, and (ii) eager unloading, by eager unloader 312, of the modules of the plurality of modules of the first portion of object code.

Some embodiments of the present invention may include one, or more, of the following operations, features, characteristics and/or advantages: (i) during the runtime phase, tracing a plurality of actual calls made in the library by operation of the first portion of object code; (ii) during the runtime phase, complementing the call tree hierarchy with dynamically resolved symbols; (iii) during the runtime phase, detecting, by a runtime linker plugin, a first symbol resolution failure instance; (iv) responsive to the detection of the first symbol resolution failure instance, loading a new module from the plurality of modules; (v) during the runtime phase, determining a plurality of unused modules of the plurality of modules; (vi) intermittently performing garbage collection on the unused modules; (vii) the division of the first portion of object code into a plurality of modules is pertinent to the execution stack; and/or (viii) the running of the first portion of object code is performed to complete a container based workload.

III. Further Comments and/or Embodiments

Some embodiments of the present invention recognize the following facts, potential problems and/or potential areas for improvement with respect to the current state of the art: (i) container based workloads tend to run on miniature operating systems and runtime libraries for simplicity and fast life cycle operations (for example: Alpine, Linux, and musl libc); (ii) the approach described in (i) above brings desired effect only if extended to all the components in the execution stack; (iii) includes virtual machine, middleware and application specific libraries; (iv) general purpose libraries cannot be stripped off beyond certain limits; (v) there is a necessity for the object code to be minimized when loaded, while expanded as required at runtime; (vi) in systems that include the features of logical splitting and lazy loading of modules, there will be several, tiny modules loaded in the address space of the process, at any given point in time; (vii) leaving the tiny modules (mentioned in the previous item) unloaded even after their usage has ceased will unnecessarily expend various computing resources (such as, processor cycles); and/or (viii) usually shared objects are not unloaded frequently, but instead stay in memory even after the holding process exits—this is because, there could be other processes in the system which may also leverage the services of the relevant library.

Some embodiments of the present invention include the feature of logical splitting of modules (similar to currently conventional technology), and eager unloading of split modules is also employed. This can result in a more natural workflow.

Some embodiments of the present invention may include one, or more, of the following operations, features, characteristics and/or advantages: (i) logically splits object code content with lazy loading and eager unloading content from and to the disk; (ii) object code can be any of the shared or non-shared libraries that the virtual machines, language runtimes, middleware components or application leverage for their functionalities; (iii) splitting is performed based on logical segregation, using call tree analysis; (iv) lazy loading is performed using extending symbol lookup by introducing a failure hook; (v) lazy loading also employs a dictionary that holds information about segregations of symbols; and/or (vi) eager unloading uses a simple heuristic based on execution profiling.

Some embodiments of the present invention may include one, or more, of the following operations, features, characteristics and/or advantages where the system is comprised of four (4) major components: (i) a static code analyzer that runs through the object code, and understands the call tree hierarchy; (ii) a runtime profiler that traces the actual calls in the library and complements the call tree hierarchy with dynamically resolved symbols; (iii) a synthetic compiler that segregates the object code into multiple modules; and (iv) a runtime linker plugin that detects symbol resolution failure and loads new modules. The same runtime profiler that also traces unused modules and garbage collects those at regular intervals.

Some embodiments of the present invention may include one, or more, of the following operations, features, characteristics and/or advantages pertaining to the static analyzer: (i) for a given object code, the system scans through each method; (ii) for a given method, its name information is stored in a stack; (iii) for a given method, the system parses through each instruction; (iv) for each instruction, the system checks if it is a call or jump instruction; (v) if it is a call or jump instruction, the system tries to calculate the jump/call target; (vi) if the target belongs to the same object code, it is pushed to the stack or continues with the next instruction; (vii) the process repeats for each method that is newly pushed; (viii) the process repeats until there are no methods remaining in the stack; (ix) the entire set of names constitutes one object module; (x) the process repeats until there are no methods in the object code; and/or (xi) at the end of the iteration, there are several modules identified.

Some embodiments of the present invention may include one, or more, of the following operations, features, characteristics and/or advantages pertaining to the runtime profiler:

(i) when the application is run, it runs alongside in a separate thread; (ii) at regular intervals, the system enumerates through each thread; (iii) for each thread, the system collects samples on the stack frame; (iv) at the end of the sample collection, the system segregates the data on a per thread basis; (v) for each thread's data, the system filters out the frames of methods that do not belong to the library; (vi) at the end of this iteration, a more granular call history is produced; (vii) the above is complimented with the static analyzer to produce fine grained modules; and/or (viii) for garbage collection, it also traces method groups that are not called for a predefined interval of time (for example, the last 10 minutes).

Some embodiments of the present invention may include one, or more, of the following operations, features, characteristics and/or advantages pertaining to a synthetic compiler: (i) collates the information obtained from the static and dynamic analyzers; (ii) reads through the object code and copies sections of the object code that belongs to the same module group; (iii) applies tradeoffs—if a method belongs to multiple modules, the system duplicates it; (iv) applies tradeoffs—if a method belongs to many modules, coalesce the modules; (v) writes metadata information in a header file; and/or (vi) the header file contains a dictionary about the modules and their incumbent methods.

Some embodiments of the present invention may include one, or more, of the following operations, features, characteristics and/or advantages pertaining to the runtime linker: (i) implements a loader hook, which means a predefined method gets called when a symbol resolution fails; (ii) the hook loads the modules metadata and performs a lookup; (iii) if an entry is found, that module is loaded; and/or (iv) a runtime linking is performed in a normal manner, or else, an unsatisfied link error is thrown.

Some embodiments of the present invention may include one, or more, of the following operations, features, characteristics and/or advantages: (i) a large percentage of modern workloads are already, or expected to be, moved to container based stacks; and/or (ii) optimizing workloads, with the help of reduced and a customized disk footprint, is a heavily explored area, as any savings in the footprint directly applies to runtime performance improvement as well as efficient resource utilization, leading to reduced operation costs to the owing business.

According to some embodiments of the present invention, there is a system and method for improving the memory footprint, bootup time and execution performance of container workloads, wherein: (i) improvement is realized through modularizing object code pertinent to the execution stack; (ii) the improvement is also realized through lazy loading and eager unloading object modules; (iii) the modularizing involves analyzing the call tree and segregating the code logically; (iv) lazy loading is performed through loading only when symbols are required; and (v) eager unloading is performed through unloading modules when no longer required.

Some embodiments of the present invention may include one, or more, of the following operations, features, characteristics and/or advantages: (i) the library is modularized into smaller pieces based on the actual requirement; (ii) aims to improve the memory footprint and performance, not security; (iii) decomposes the library into minute modules based on call history; (iv) loading of the shared library in not required; (v) focusses on splitting object code and using them on demand; (vi) splits loading of content based on the identified usage in a workload; (vii) performs call-tree analysis on a per-workload basis to identify splits; (viii) uses split functions; (ix) augments static profiling with dynamic profiling to re-instate the modular boundaries to the finest extent; and/or (x) uses logical splitting of machine instructions in its binary format, based on call tree analysis.

In eager unloading, the frequency is profiled at which loaded modules are used—by maintaining a simple heuristics of counting the calls that are targeted for specific modules. If a module is not used for a predefined (configurable) amount of time (for example 10 minutes), then the module is unloaded from memory. This means if an unloaded module is required again, it needs to be loaded. So, while functionally there is no implications to the unloading, it adds value to performance and runtime footprint—by prioritizing frequently used modules in the memory.

Typically, the length of "an extended period of time" involves making a tradeoff between the benefit the system designer wants to reap (runtime footprint reduction and fast execution), and the effort for loading and unloading (off-loading) modules very frequently. Heuristically, 10 minutes can be considered a reasonable time period, because many workloads have 10-20 minutes as the garbage collection interval (time duration of garbage piling up in the heap).

The way in which it is known what programs are going to be used in the future will now be discussed. It cannot be known upfront. The shared library concept of the 1990's (wherein a library is shared among tens of processes) have diverged a lot since then. For example, in a Java process, there are ten plus shared libraries, but they are not reused by any other process in a typical production box (wherein there are no pluralities of processes).

Below is one main use case where embodiments of the present invention potentially add a lot of value:
shared modules are not shared in modern workload
dedicated modules carry a lot of redundant code
if a logical splitting based on the need of the workload can be achieved, it can run efficiently.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
receiving a first portion of object code; analyzing a first portion of object code in a static manner to determine a call tree hierarchy;
segregating, by a synthetic compiler, the first portion of object code into a plurality of modules;
starting to run the first portion of object code to start a runtime phase, with the running of the first portion of the object code including:
　lazy loading of the modules of the plurality of modules of the first portion of object code, and
　eager unloading of the modules of the plurality of modules of the first portion of object code;
　during the runtime phase, tracing a plurality of actual calls made in the library by operation of the first portion of object code; and
　during the runtime phase, complementing the call tree hierarchy with dynamically resolved symbols;
　during the runtime phase, detecting, by a runtime linker plugin, a first symbol resolution failure instance; and
　responsive to the detection of the first symbol resolution failure instance, loading a new module from the plurality of modules.

2. The CIM of claim 1 further comprising:
during the runtime phase, determining a plurality of unused modules of the plurality of modules; and
intermittently performing garbage collection on the unused modules.

3. The CIM of claim 1 further comprising:
the division of the first portion of object code into a plurality of modules is pertinent to the execution stack.

4. The CIM of claim 1 wherein the running of the first portion of object code is performed to complete a container based workload.

5. A computer program product (CPP) comprising:
a set of storage device(s); and
computer code stored collectively in the set of storage device(s), with the computer code including data and instructions to cause a processor(s) set to perform at least the following operations:
receiving a first portion of object code,
analyzing a first portion of object code in a static manner to determine a call tree hierarchy,
segregating, by a synthetic compiler, the first portion of object code into a plurality of modules,
starting to run the first portion of object code to start a runtime phase, with the running of the first portion of the object code including,
　lazy loading of the modules of the plurality of modules of the first portion of object code, and
　eager unloading of the modules of the plurality of modules of the first portion of object code;
　during the runtime phase, tracing a plurality of actual calls made in the library by operation of the first portion of object code, and
　during the runtime phase, complementing the call tree hierarchy with dynamically resolved symbols,
　during the runtime phase, detecting, by a runtime linker plugin, a first symbol resolution failure instance; and
　responsive to the detection of the first symbol resolution failure instance, loading a new module from the plurality of modules.

6. The CPP of claim 5 wherein the computer code further includes instructions for causing the processor(s) set to perform the following operation(s):
during the runtime phase, determining a plurality of unused modules of the plurality of modules; and
intermittently performing garbage collection on the unused modules.

7. The CPP of claim 5 wherein the computer code further includes instructions for causing the processor(s) set to perform the following operation(s):
the division of the first portion of object code into a plurality of modules is pertinent to the execution stack.

8. The CPP of claim 5 wherein the running of the first portion of object code is performed to complete a container based workload.

9. A computer system (CS) comprising:
a processor(s) set;
a set of storage device(s); and
computer code stored collectively in the set of storage device(s), with the computer code including data and instructions to cause the processor(s) set to perform at least the following operations:
receiving a first portion of object code,
analyzing a first portion of object code in a static manner to determine a call tree hierarchy,
segregating, by a synthetic compiler, the first portion of object code into a plurality of modules,
starting to run the first portion of object code to start a runtime phase, with the running of the first portion of the object code including,
　lazy loading of the modules of the plurality of modules of the first portion of object code, and
　eager unloading of the modules of the plurality of modules of the first portion of object code;
　during the runtime phase, tracing a plurality of actual calls made in the library by operation of the first portion of object code, and
　during the runtime phase, complementing the call tree hierarchy with dynamically resolved symbols,
　during the runtime phase, detecting, by a runtime linker plugin, a first symbol resolution failure instance; and
　responsive to the detection of the first symbol resolution failure instance, loading a new module from the plurality of modules.

10. The CS of claim 9 wherein the computer code further includes instructions for causing the processor(s) set to perform the following operation(s):
during the runtime phase, determining a plurality of unused modules of the plurality of modules; and
intermittently performing garbage collection on the unused modules.

11. The CS of claim 9 wherein the computer code further includes instructions for causing the processor(s) set to perform the following operation(s):
the division of the first portion of object code into a plurality of modules is pertinent to the execution stack.

12. The CS of claim 9 wherein the running of the first portion of object code is performed to complete a container based workload.

* * * * *